United States Patent
Cabanes et al.

(10) Patent No.: US 7,698,651 B2
(45) Date of Patent: Apr. 13, 2010

(54) HEURISTIC KNOWLEDGE PORTAL

(75) Inventors: Alex Cabanes, Cary, NC (US); Alice Chiang, Portola Valley, CA (US)

(73) Assignee: International Business Machines Corporation, Armonk, NY (US)

( * ) Notice: Subject to any disclaimer, the term of this patent is extended or adjusted under 35 U.S.C. 154(b) by 2048 days.

(21) Appl. No.: 09/893,541

(22) Filed: Jun. 28, 2001

(65) Prior Publication Data

US 2003/0001900 A1   Jan. 2, 2003

(51) Int. Cl.
*G06F 3/048* (2006.01)

(52) U.S. Cl. .................. 715/775; 715/776; 715/777; 715/778; 715/780

(58) Field of Classification Search ............ 345/853, 345/854, 840; 715/500, 775, 776, 777, 778, 715/780
See application file for complete search history.

(56) References Cited

U.S. PATENT DOCUMENTS

| | | | |
|---|---|---|---|
| 5,050,071 A | 9/1991 | Harris et al. | |
| 5,708,825 A | 1/1998 | Sotomayor | |
| 5,790,121 A * | 8/1998 | Sklar et al. .................. | 715/853 |
| 5,918,236 A | 6/1999 | Wical | |
| 5,940,820 A | 8/1999 | Kagiwada | |
| 5,963,965 A | 10/1999 | Vogel | |
| 6,029,180 A | 2/2000 | Murata et al. | |
| 6,031,537 A | 2/2000 | Hugh | |
| 6,037,935 A | 3/2000 | Bates et al. | |
| 6,054,989 A | 4/2000 | Robertson et al. | |
| 6,075,530 A | 6/2000 | Lucas et al. | |
| 6,088,032 A | 7/2000 | Mackinlay | |
| 6,133,913 A | 10/2000 | White et al. | |
| 6,133,914 A | 10/2000 | Rogers et al. | |
| 6,339,745 B1 * | 1/2002 | Novik .......................... | 701/208 |
| 6,348,935 B1 * | 2/2002 | Malacinski et al. ......... | 345/853 |
| 6,499,026 B1 * | 12/2002 | Rivette et al. .................. | 707/2 |
| 6,691,282 B1 * | 2/2004 | Rochford et al. ............ | 715/514 |
| 6,745,201 B2 * | 6/2004 | Gould et al. ................. | 707/102 |
| 6,957,205 B1 * | 10/2005 | Liongosari ................... | 706/45 |

OTHER PUBLICATIONS

Pluspat/Inspec Abstract Printouts.
Internet: Miller, et al., "SPHINX: A Framework for Creating Personal, Site-Specific Web Crawlers," 1998/1999.
MacroBot Fact Sheet.
Poskanzer, "Spider—A Web-Robot Class," 1996.

(Continued)

*Primary Examiner*—Simon Ke
(74) *Attorney, Agent, or Firm*—Tucker Ellis & West LLP

(57) ABSTRACT

A user interface method for executing one or more operations in a computer for interfacing an associated user with a knowledge portal (10) that is operatively associated with a plurality of data objects in a data store (12) includes the steps of: receiving a user input (202); updating, based upon the received user input, one of a current object identity (82), a preview object identity (86), and a K-map parameter (84); updating a K-map conditional upon updating one of a current object identity (82) and a K-map parameter (84); displaying in a document pane (72) at least a portion of the current object; displaying in a map pane (74) the K-map; and displaying in a preview pane (76) contents associated with the preview object.

39 Claims, 5 Drawing Sheets

OTHER PUBLICATIONS

Cyrosoft, DISCo Pump offline browser, 2000.

IBM, Mapuccino.

Spetka, "The TkWWW Robot; Beyond Browsing," SUNY Institute of Technology at Utica/Rome.

TrackerV3, Advanced File System Explorer, 2000.

* cited by examiner

HEURISTIC KNOWLEDGE PORTAL

BACKGROUND OF THE INVENTION

The present invention relates to knowledge management, and more particularly to knowledge portals. It will be described with exemplary reference to an electronic information network of a business corporation. However, it will be appreciated that the invention is not so limited, but rather will find application in many areas which utilize information creation, storage, and distribution.

With the ever-growing volume of information stored on electronic systems, the historical methods for information management are shifting toward an emphasis on knowledge management. Conventional information management systems index whole documents without directly addressing the document content. For example, a computer hard drive includes a folder tree or a directory tree, each branch of which contains lower-level folders and/or documents. In such a system, each document is placed at a single branch of the folder tree, even if the document is in fact closely related to two or more different branches. For example, a departmental monthly report typically includes information relating to a range of areas and projects in which that department is involved. Nevertheless, the entire report document is stored on a single branch of the folder tree. Of course, copies of the report are optionally placed elsewhere in the folder tree to enable convenient and intuitive access to the report from these other branches as well. However, such document duplication is undesirable because it wastes system storage resources and greatly complicates subsequent updating of the report. A typical result of such duplication is the generation of numerous copies of various versions of the report, and retrieval of dated or erroneous information therefrom.

The directory tree structure is typically manually created by a plurality of users, which in large corporate environments can number in the hundreds of users or more. As a result, the structural scheme and nomenclature (i.e., folder names and document names) created by one user is often completely non-intuitive for other users, or even for the creating user at a later date. This further complicates efficient and intuitive retrieval of information, and in practice limits retrieval to individuals with a good understanding of the structure of the directory system and its contents in the area of interest to the individual.

Knowledge management systems, sometimes called knowledge portals, provide a new way of organizing and accessing knowledge contained in documents. Knowledge portals use contextual searching, whereby relevant documents are easily located by the user following a heuristic search path of content-based links. When accessing knowledge and information using a knowledge portal, the user is not required to have a prior understanding of the folder tree structure in order to locate pertinent information. Rather, documents are linked contextually based upon the document content, thereby enabling heuristic searching by a user. This searching is implemented for example through a keyword search initiated by the user. The context of a given document is typically described in terms of the knowledge categories to which the document relates, and a given document is typically included under many different knowledge categories. For example, an article on the IBM Corporation can properly relate to a wide range of knowledge categories including: "IBM", "general business", "e-business", "software", "computers", "state of New York", "DB2", and others. These various categories, in turn, have certain interrelationships. The categories of "computers" and "software" are very closely related, whereas "DB2" and "state of New York" are much less closely related.

Each of these categories, in turn, includes typically many other documents besides the aforementioned article on the IBM Corporation. For example, "general business" may include documents relating to other corporations and to the stock market, as well as including every document identified under the "e-business" category, which is a sub-category of the "general business" category. In this manner, the knowledge portal places a document into context with respect to other information stored and available on the electronic information system.

A typical knowledge portal includes a catalog of information, typically called an information catalog or a knowledge base, that relates to the contents of an associated collection of documents. The associated collection of documents are typically documents generated and stored in the electronic information system in the ordinary course of business operations (in the exemplary case of a corporate computer network) and can include word processing documents, image documents, electronic mail, spreadsheets, and the like. The scope of the knowledge portal optionally includes every document in the system. Alternatively, the scope includes only certain documents, e.g. only documents which are not restricted-access, or only documents relating to technology. The scope can also be expanded to catalog outside information such as selected Internet web pages. People can also be cataloged by a knowledge portal.

It will be appreciated that the conventional folder or directory tree-based information management system is typically not altered by the addition of a knowledge portal. Rather, the knowledge portal serves as an advanced user interface that provides an improved and more efficient and intuitive means for accessing the stored information.

The knowledge categories or classifications in the catalog are typically represented by knowledge objects (e.g., people, places, things) and their relationships to each other. Preferably, the catalog is automatically generated and maintained by analysis tools, such as a text analysis tool or a text parser. The text parser preferably analyzes every newly created document which falls within the scope of the knowledge portal, and extracts certain key words, sometimes called tokens. Based upon the tokens of a large number of documents, the cataloged objects are identified and interrelated. Each new document is contextually placed within the catalog classification system. As new documents are created, the catalog is updated through addition of new knowledge objects, and through new or changed interrelations between the objects. The catalog is also usually manually editable so that the knowledge portal can be tuned to more precisely meet the needs of its users.

Linkages or affiliations for individual people are typically established by analysis of the documents created or read by the individual, such analysis also being performed by the text analysis tool. A person's affiliations are typically editable at least by that person, and addition of new affiliations preferably requires approval of the individual or another authorized person, e.g. the person's manager.

A critical component of a knowledge portal is the user interface and the corresponding method by which the user is made aware of and accesses the related information. The prior art discloses knowledge maps, or K-maps, for identifying objects closely associated with a keyword search or with a current document. Prior art K-maps are typically a list of related documents and knowledge objects. In a typical prior art arrangement, for each related document or knowledge object the K-map displays a title or other descriptive text and a rating value which indicates how closely the object relates to the document. Upon selection of a document from such a K-map, the document is typically displayed in place of the K-map. In the case of a current document, a user typically requests a K-map relating to that document, and the K-map associated with the document is then constructed and displayed in place of the current document.

The prior art user interface and method therefor has several disadvantages. It typically does not allow for simultaneous viewing of a document and its associated K-map. This mutually exclusive displaying is extremely inconvenient when carrying out a heuristic search, as the user must constantly switch back and forth between the K-map view and the document view.

The prior art typically also does not permit previewing of related documents or of summary information pertaining thereto. Instead, the user must load the entire document and, if it turns out to be irrelevant, must subsequently reload the K-map.

The prior art methods typically require the user to enter keywords into a search dialog window to initiate a new search direction that is not explicitly shown on the K-map. In a typical scenario, a user will read a document and come across terms, phrases, words, or the like that appear interesting and possibly relevant to the topic under review. The user then has to either type the keywords into the search dialog window, or use cut-and-paste operations to transfer the keywords to the search dialog window. These operations are time consuming, and additionally introduce opportunities for user errors.

The present invention contemplates an improved knowledge portal user interface and method therefor, which overcomes these limitations and others.

SUMMARY OF THE INVENTION

In accordance with one aspect of the present invention, a user interface method is disclosed for executing one or more operations in a computer for interfacing an associated user with a knowledge portal that is operatively associated with a plurality of data objects. A user supplies a user input. At least one of a current object identity, a preview object identity, and a K-map parameter is updated based upon the received user input. A K-map is updated conditional upon updating a K-map parameter. At least a portion of the current object is displayed in a document pane. The K-map is displayed in a map pane. Contents associated with the preview object are displayed in a preview pane.

The step of updating, based upon the received user input, at least one of a current object identity, a preview object identity, and a K-map parameter preferably includes updating a K-map view selector based upon the received user input. The step of displaying in a map pane the K-map preferably includes selectively displaying one of a tree view and a node view of the K-map based upon the setting of the K-map view selector.

The step of updating, based upon the received user input, at least one of a current object identity, a preview object identity, and a K-map parameter preferably includes updating a K-map class selector value based upon the received user input. The step of updating a K-map conditional upon updating a K-map parameter preferably includes updating the K-map to include objects corresponding to the K-map class selector value. The step of updating a K-map class selector value preferably includes updating the K-map selector value to correspond to one of a people class, a places class, and a things class based upon the received user input.

The step of updating, based upon the received user input, at least one of a current object identity, a preview object identity, and a K-map parameter preferably includes updating a K-map scope based upon the received user input. The step of updating a K-map conditional upon updating a K-map parameter preferably includes updating the K-map to include objects within the K-map scope.

The step of receiving a user input preferably includes receiving a selection of the current object identity from the user through the K-map pane. The step of updating a K-map conditional upon updating a K-map parameter preferably includes updating the K-map to include objects related to the current object.

The step of receiving a user input preferably includes receiving a selection of the preview object identity from the user through the K-map pane.

The step of receiving a user input preferably includes receiving a text entry supplied through user highlighting of text in the document display pane. The step of updating, based upon the received user input, at least one of a current object identity, a preview object identity, and a K-map parameter preferably includes updating an object K-map parameter to correspond with the received text entry. The step of updating a K-map conditional upon updating a K-map parameter preferably includes updating the K-map to include objects related to the selected text.

The user interface method preferably also includes simultaneously displaying the document pane, the map pane, and the preview pane on a single display device.

In accordance with another aspect of the present invention, an apparatus is disclosed for executing one or more operations in a computer for interfacing an associated user with a knowledge portal operatively associated with a plurality of data objects. A computer has a data store coupled thereto, wherein the data store stores the plurality of data objects. One or more computer programs performed by the computer implement the user interface method steps as specified previously.

In accordance with yet another aspect of the present invention, an article of manufacture is disclosed that comprises a program storage medium readable by a computer and embodying one or more instructions executable by the computer to perform method steps for executing an operation to perform a user interface method for interfacing an associated user with a knowledge portal operatively associated with a plurality of data objects. The performed user interface method includes the user interface method steps as specified previously.

In accordance with still yet another aspect of the present invention, a user interface is disclosed for interfacing an associated user with a knowledge portal that is operatively associated with a plurality of data objects. A means is provided for receiving a user input. A K-map processor calculates a K-map corresponding to a current object and a set of K-map parameters. A current object display pane displays at least a portion of the current object. A K-map display pane displays the K-map. A preview pane displays contents corresponding to a preview object.

Preferably, the set of K-map parameters includes a view mode parameter, and the K-map display pane displays the K-map in a node view conditional upon the view mode parameter corresponding to a node view, while the K-map display pane displays the K-map in a tree view conditional upon the view mode parameter corresponding to a tree view.

The set of K-map parameters preferably includes a class parameter, and the K-map processor calculates a K-map containing objects limited to objects corresponding to the class parameter. The means for receiving a user input optionally includes a pointing device selection means operative at least within the K-map display pane, whereby the class parameter is selectively updateable by the user via the pointing device selection means operating on a graphical class input dialog. The class parameter preferably selectively takes values including a people class value, a places class value, and a things class value.

The set of K-map parameters preferably includes a scope parameter, and K-map processor calculates a K-map containing objects limited to objects whose relationship to the current object falls within the scope parameter value. The means for receiving a user input optionally include a pointing device selection means operative at least within the K.-map display pane, whereby the scope parameter is selectively updateable by the user via the pointing device selection means operating on a graphical scope input dialog. Preferably, the graphical scope input dialog is a slider bar.

The means for receiving a user input preferably include a pointing device selection means operative at least within the K-map display pane, and the current object is selectively updateable by the user via the pointing device selection means operating within the K-map display pane.

The means for receiving a user input preferably include a pointing device selection means operative at least within the K-map display pane, and the preview object is selectively updateable by the user via the pointing device selection means operating within the K-map display pane.

The set of K-map parameters preferably includes an object parameter that is selectively updateable by the user, and the K-map processor calculates a K-map containing objects related to the object corresponding to the object parameter.

The means for receiving a user input preferably include a pointing device selection means operative at least within the document display pane whereby the user selectively updates the object parameter by selecting text corresponding thereto from the contents of the document display pane.

One advantage of the present invention is that it permits previewing of a document or object identified by a K-map.

Another advantage of the present invention is that it permits simultaneous viewing of the current document, the K-map, and a preview or summary of at least one item in the K-map.

Yet another advantage of the present invention is that it facilitates following up on keywords and other search items located in a document.

Still further advantages and benefits of the present invention will become apparent to those of ordinary skill in the art upon reading and understanding the following detailed description.

BRIEF DESCRIPTION OF THE DRAWINGS

The invention may take form in various components and arrangements of components, and in various steps and arrangements of steps. The drawings are only for the purposes of illustrating preferred embodiments and are not to be construed as limiting the invention.

DETAILED DESCRIPTION OF THE PREFERRED EMBODIMENTS

Figure 1:
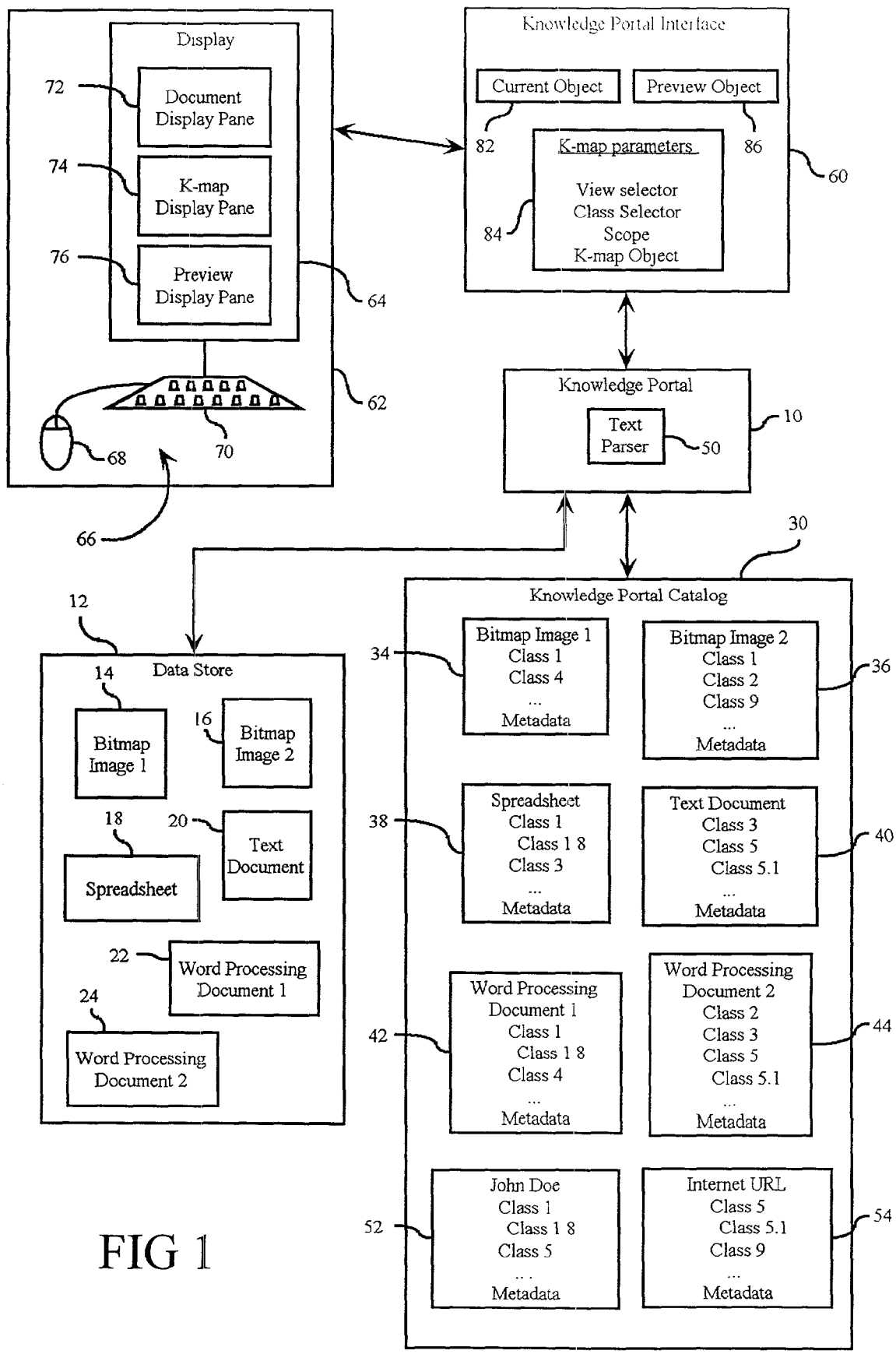
FIG. 1 shows a typical knowledge portal structure according to one embodiment of the invention.

With reference to FIG. 1, an exemplary knowledge portal 10 formed in accordance with a preferred embodiment of the invention is described. The knowledge portal 10 is in operative communication with one or more data stores 12, which typically include disk storage systems, network resources, and the like. The knowledge store 12 includes a plurality, of data objects, represented in FIG. 1 by six objects including two bitmap images 14, 16, a spreadsheet 18, a text document 20, and two word processing documents 22, 24. Of course, the data store typically includes many more documents, number in the hundreds, thousands, or more. The documents are preferably organized in a conventional hierarchal directory tree structure (not shown) which in the past has been the primary pathway for user access to the files. In this access pathway, the user must first know a priori that the document exists, and also know the directory tree path to the file.

The knowledge portal 10 provides an improved access pathway, wherein the user locates information in a heuristic manner by following content-based links between objects to find relevant information and data. The knowledge portal 10 maintains a catalog 30 of objects. For example, the six objects 14, 16, 18, 20, 22, 24 in the data store 12 have analogous entries 34, 36, 38, 40, 42, 44 in the knowledge portal catalog 30. Each entry in the catalog 30 preferably includes classification thereof according to a classification system (not shown). In the exemplary catalog 30 of FIG. 1, classes are designated numerically, e.g. "Class 1", "Class 2", etc. The classification system is preferably hierarchal in nature, e.g. "Class 1.8" is a sub-class of "Class 1", while "Class 5.1" is a sub-class of "Class 5". As shown, each entry in the catalog 30 is typically classified under multiple classes.

The classification system is based upon the information content of the objects contained in data store 12. It is preferably automatically generated by the knowledge portal 10 based upon analysis of the contents of the objects, e.g. using a text parser 50 or other tools. Objects are preferably also classified in an automated manner. Of course, manual maintenance of both the classification system and the assigned classes for individual entries is advantageously also supported.

In addition to the classifications, each entry 34, 36, 38, 40, 42, 44 in the knowledge portal catalog 30 preferably optionally includes additional information about the object, commonly termed metadata. The metadata can include text, such as a short synopsis or summary of the contents of the object, author information, links to additional resources, and the like. The metadata provides additional information for the user and is optionally used to further refine the heuristic searching.

The catalog 30 preferably includes additional entries beyond those corresponding to objects in the data store 12. The catalog advantageously incorporates people, e.g. John Doe 52, with each person having associated classes and metadata. External resources such as Internet uniform resource locator (URL) addresses 54 are also optionally incorporated. The result is a content-based catalog 30 which clarifies and emphasizes inter-relationships between the available information.

The knowledge portal 10 advantageously provides users, and especially non-technical users, with fast and convenient access to the information contained on the data store 12 or on other cataloged resources. A critical component of the information portal 10 is the user interface 60 by which the user engages the knowledge portal 10 to access the cataloged information. The user typically accesses the knowledge portal 10 through an electronic device 62, which can be a networked personal computer, networked laptop computer, personal data assistant (PDA), Internet-capable cellular telephone, or the like. The electronic device 62 typically includes at least a display 64 and a means for receiving user input 66. Preferably, the input means includes a pointing device 68 such as a mouse, track ball, or the like, and a keyboard 70 for text and alphanumeric input.

In a preferred embodiment illustrated in FIG. 1, the user interface provides at least three display panes on the display 64, including a document display pane 72, a knowledge map, or K-map, pane 74, and a preview display pane 76. Preferably, the three panes are displayed simultaneously, e.g. in windows or panes appearing simultaneously on the same display 64. The document display pane 72 is used to display a current object 82 (which advantageously also can be a name 52, Internet URL 54, or other entry in the catalog 30). The K-map display pane 74 identifies objects and other entries in the catalog 30 that relate to the current object 82 or to another selected object. The range of objects included in the K-map are preferably determined by K-map parameters 84 such as a view selector, Class selector, Scope, K-map object, and the like. The identity, significance, and manipulation of these parameters will be discussed later. However, it is pointed out here that the K-map object typically, although by no means necessarily, corresponds to the current object 82. The preview display pane 76 displays a summary or other content relating to a selected preview object 86. It will be appreciated that the three-pane display thus described provides the user with current information for review, an information map, e.g. K-map giving suggestions about preferred search paths and directions, and a preview pane for previewing a new item or information relating thereto before loading it into the document display pane 72.

The present invention, one preferred embodiment of which is illustrated in FIG. 1, is typically implemented using one or more computer programs, each of which executes under the control of an operating system, such as OS/2, Windows, DOS, AIX, UNIX, MVS, etc., and causes at least one computer to perform the desired functions as described herein. Thus, using the present specification, the invention may be implemented as a machine, process, or article of manufacture by using standard programming and/or engineering techniques to produce software, firmware, hardware or any combination thereof.

Generally, the computer programs and/or operating system are all tangibly embodied in a computer-readable device or media, such as memory, data storage devices, and/or data communications devices, thereby making a computer program product or article of manufacture according to the invention. As such, the terms "article of manufacture" and "computer product" as used herein are intended to encompass a computer program accessible from any computer readable device or media.

Moreover, the computer programs and operating system are comprised of instructions which, when read and executed by the at least one computer, cause the computer to perform the steps necessary to implement and/or use the present invention. Under control of the operating system, the computer programs may be loaded from the memory, data storage devices, and/or data communications devices into the memories of the computer for use during actual operations. Those skilled in the art will recognize many modifications may be made to this configuration without departing from the scope of the present invention.

Figure 2:
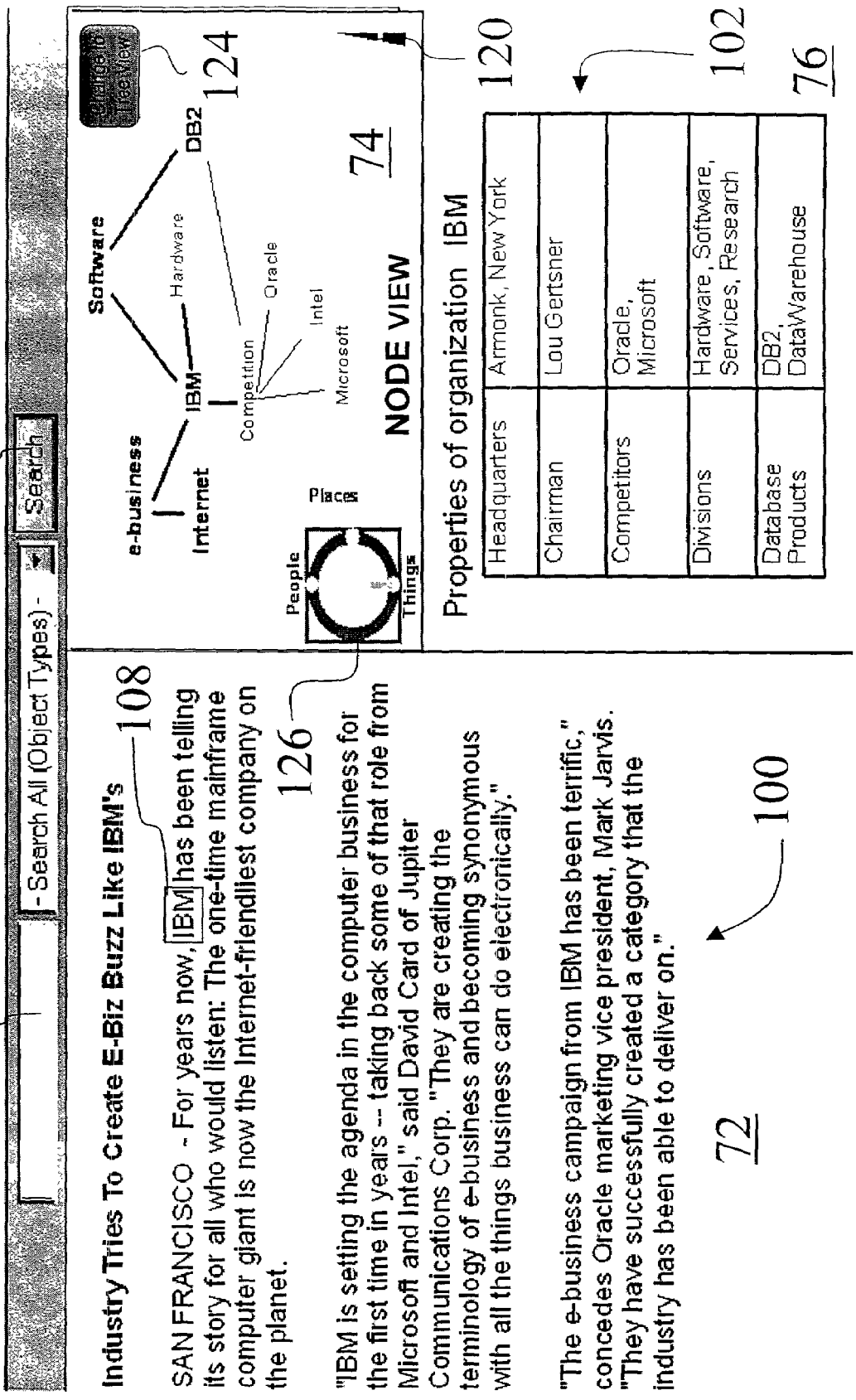
FIG. 2 shows a typical user interface display in accordance with one embodiment of the invention.

With particular reference now to FIG. 2, an exemplary three-pane display is described. Preferably, the document display pane 72 displays the contents of the current object 82. For the exemplary text document 20, the actual text is displayed 100 as shown in FIG. 2. For non-text documents, the content is preferably displayed in a suitable format, if the document format is interpretable by the knowledge portal 10. For example, the word processing documents 22, 24 are advantageously displayed in the document display window 72 using a viewer component (not shown) of the knowledge portal 10 that supports the word processing document format. However, if no viewer that supports the format of the selected file is available, the metadata contained in the catalog 30 entry is preferably displayed instead.

Preferably, the preview display window 76 displays content related to the preview object 86. The displayed data is advantageously metadata related to the catalog 30 entry. For a document, a summary of the document is preferably displayed. For other types of objects or catalog 30 entries, the metadata is preferably displayed in a table format. For a person 52, the properties displayed in the table can be their address, telephone number, electronic mail address, employer, education degree, and so forth. For an Internet URL 54 the tabulated data can be the address, the page title, page author, last access date, and et cetera. The displayed preview data should be readily accessible and load quickly, so that the preview provides a rapid means for surveying the contents of the preview object 86. In FIG. 2, the selected preview object is "IBM", and the table 102 displays metadata relating thereto, such as the location of the corporate headquarters, Chairman's name, primary business competitors, corporate divisions, and principle commercial products.

The selection of the current object 82 and the preview object 86 is advantageously done using the pointing device 68 operating within at least the K-map display pane 74. In a preferred embodiment, an element in the K-map is previewed by hovering the pointer over the element. Alternatively, a single-click can be used to select the element as the preview object 86. Selection of the current object 82 preferably requires a more positive action, e.g. double-clicking on the K-map element. Of course, alternative navigation methods, such as keyboard 70 navigation, are optionally also supported.

Figure 3A:
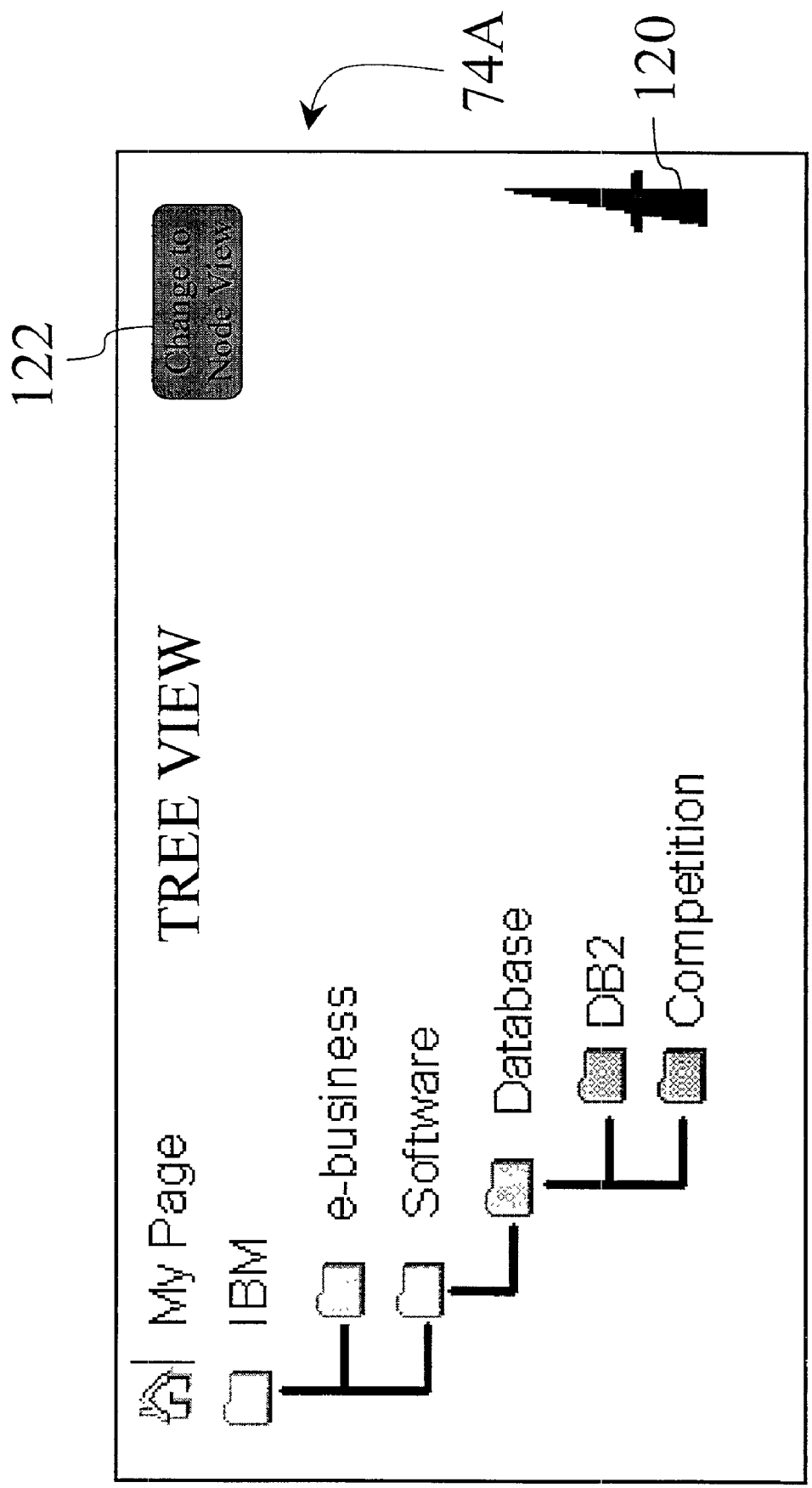
FIG. 3A shows an exemplary tree view of the K-map of FIG. 1.
Figure 3B:
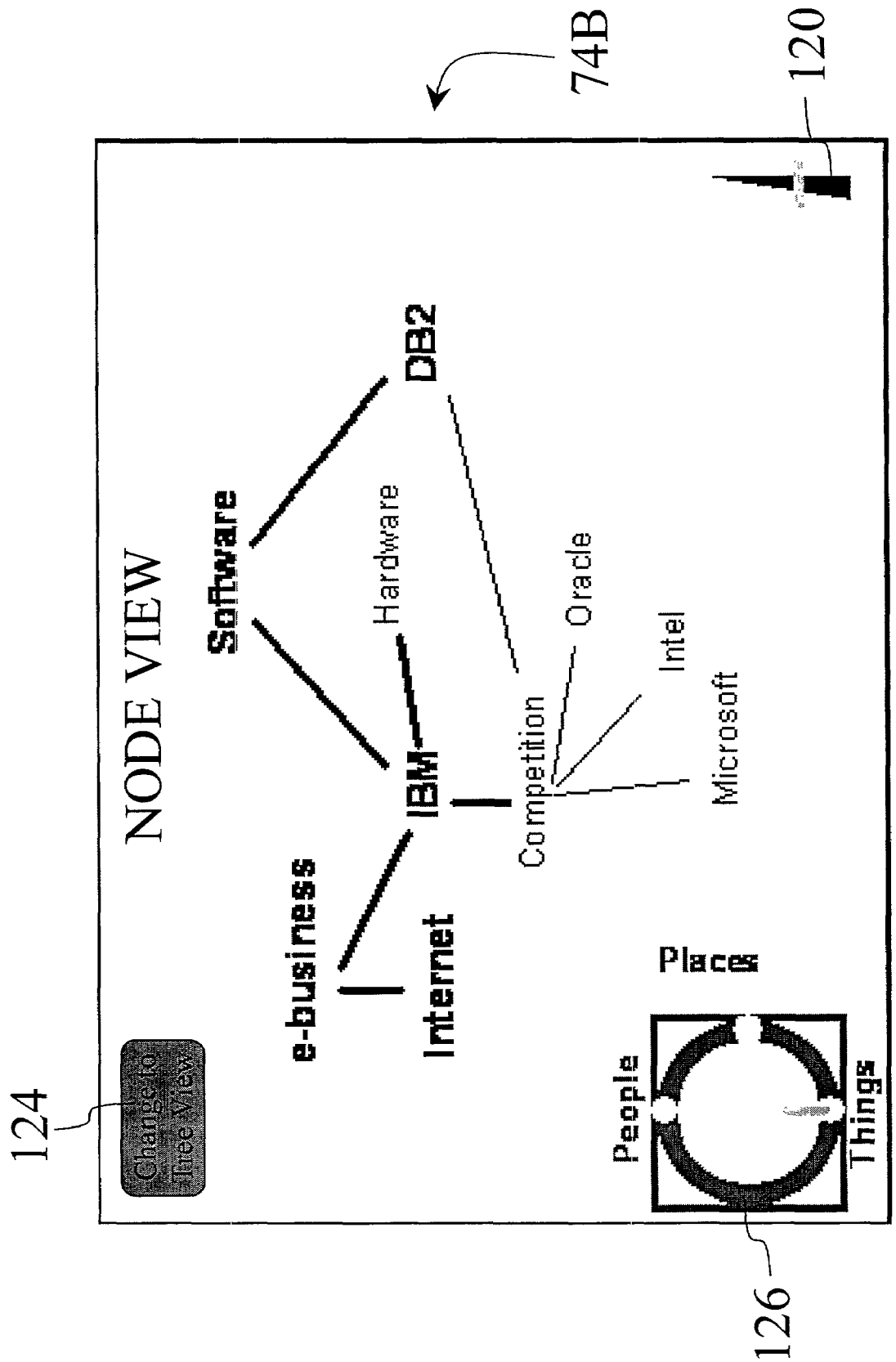
FIG. 3B shows an exemplary node view of the K-map of FIG. 1.

With continuing reference to FIGS. 1 and 2, and with further reference now to FIGS. 3A and 3B, the K-map display pane 74 is described in greater detail. The K-map displays elements of the catalog 30 that are related to the K-map object and that meet the restrictions of the other K-map parameters 84. These elements can be objects, names, et cetera. Preferably, the K-map also displays related classes. In FIG. 3A a tree view 74A of the K-map is shown. This view advantageously shows a hierarchal relationship between the classifications. For example, the tree view 74A clearly shows that "e-business" is a branch of "IBM". Preferably, a user selecting the "e-business" element of the tree view 74A would see only e-business contents which fall under the "IBM" class. The tree view 74A thus guides the user in narrowing the search as the user traverses the tree structure.

With particular reference now to FIG. 3B, a node view 74B is shown. The node view advantageously shows related catalog 30 elements in a non-hierarchal format. The "e-business" element of the node view 74B is not limited to contents which fall under the "IBM" class. Rather, as shown it includes a link to "Internet" which does not fall below "IBM" in the hierarchal view of FIG. 3A. The node view thus guides the user in broadening the search as the user investigates related nodes. The node view 74B of the K-map enables the user to locate relevant information which the user may not have been initially aware of.

The K-map display pane 74 preferably provides the user with graphical input means for adjusting the various K-map parameters 84. In FIGS. 3A and 3B the K-map scope is adjustable using a "Scope" slider bar 120. The Scope restricts the contents of the K-map by limiting the K-map to only those elements with a strength of relationship greater than a specified value. As is known to the art, the strength of relationship is determined by factors including the number of common classifications two elements include, and the hierarchal classification relationship between two elements. FIG. 3A includes a button 122 for switching to the node view, while FIG. 3B includes a corresponding button 124 for switching to the tree view.

With particular reference to FIG. 3B another K-map parameter, the Class Selector, is selectable using the input 126. This input limits the K-map to elements of a selected class. The selector input 126 includes selections for limiting the K-map to the people class, the places class, and the things class. Of course more, fewer, or different class selections can be included therein. Other graphical selectors are also contemplated, such as check boxes, which enable support of multiple classes selection, or which enable support of class exclusion (e.g., exclude persons from the K-map).

The K-map is constructed with respect to a K-map object that typically includes one or more keywords. The user interface 60 preferably supports a plurality of ways to select the K-map object. With reference to FIG. 2, the user can type the keyword or keywords corresponding to the K-map object into a search dialog window 104 and select the search button 106, whereby the new K-map is constructed and displayed. Alternatively, the user optionally double-clicks on an element of the current K-map (step not shown) to make that element the new K-map object. Preferably, the user also has the option of highlighting a particular text 108, e.g. in the exemplary FIG. 2 highlighting "IBM" in the text 100, using the pointing device 68 to select that text as the K-map object.

Figure 4:
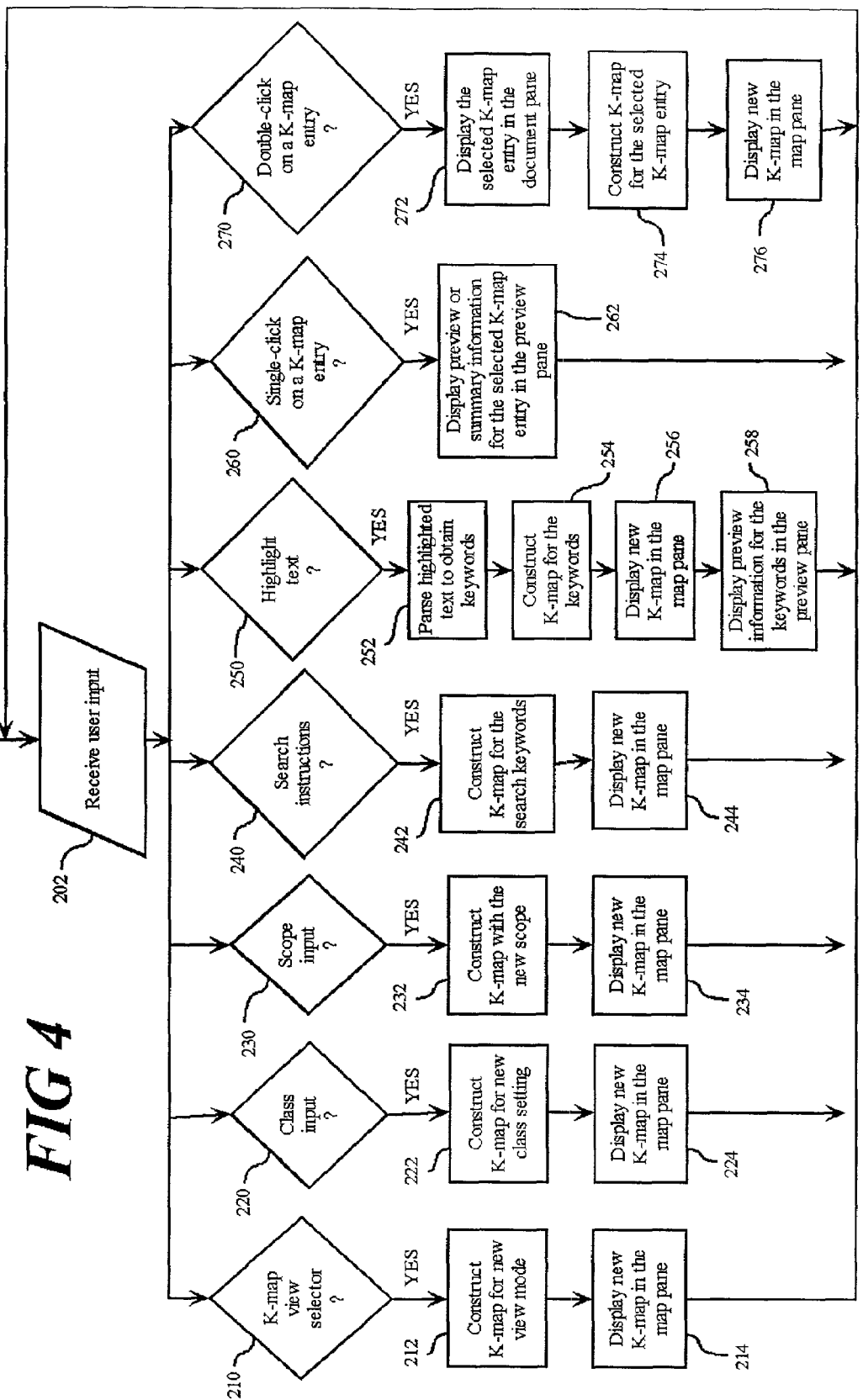
FIG. 4 shows a flowchart of a user interface method in accordance with one embodiment of the invention.

With continuing reference to FIGS. 1-3B and with further reference now to FIG. 4, the user interface method is described in greater detail. Starting 200 at a view such as that of FIG. 2, the method waits to receive a user input 202. Based upon the input, one of a number of paths can be taken. A first set of user input and selection options are used to control aspects of the K-map display as discussed next.

Conditional upon the K-map view selector 122, 124 being selected in a step 210, the knowledge portal 10 constructs a new K-map in accordance with the selected viewing mode (tree view or node view) in a step 212, and displays the new K-map in the map pane 74 in a step 214. Preferably, the "View selector" K-map parameter 84 is updated appropriately. This implements the switching between the tree view 74A and the node view 74B. Of course, other viewing modes are also contemplated and can be incorporated into the knowledge portal in a similar manner.

Conditional upon the class input 126 being changed in a step 220, e.g. from "Things" as shown in FIG. 3B to "People" or "Places", the knowledge portal 10 constructs a new K-map in accordance with the newly selected class limitation in a step 222, and displays the new K-map in the map pane 74 in a step 224. Preferably the "Class selector" K-map parameter 84 is updated appropriately. This implements the K-map class restrictions selection option.

Conditional upon the scope input 120 being changed in a step 230, the knowledge portal 10 constructs a new K-map in accordance with the changed scope in a step 232, and displays the new K-map in the map pane 74 in a step 234. Preferably the "Scope" K-map parameter 84 is updated appropriately. This implements the K-map scope selection option.

The set of user input/selection options described next specifically control the K-map Object parameter 84. Conditional upon receiving search instructions in the search dialog window 104 in a step 240, the knowledge portal 10 constructs a K-map corresponding to the entered search keywords in a step 242, and displays the new K-map in the map pane 74 in a step 244. Typically, the user will select the "Search" button 106 to initiate the building of the new K-map. This implements a conventional knowledge portal operational mode wherein the user inputs search parameters in a search dialog box.

Conditional upon the user highlighting on-screen text, e.g. the text "IBM" 108 in the current document 100 in a step 250, the knowledge portal 10 parses the highlighted text to obtain keywords in a step 252, constructs a K-map corresponding to the parsed keywords in a step 254, and displays the new K-map in the map pane 74 in a step 256. Optionally, the knowledge portal 10 also displays the preview or summary information from the catalog 30 relating to the parsed keywords in a step 258 in the preview display pane 76. Preferably, the K-map object parameter 84 is also updated based upon the parsed keywords. This implements an improved knowledge portal 10 navigation means whereby the user merely highlights text and receives feedback from the knowledge portal 10 in the form of a corresponding K-map and preview information.

Still another set of user input/selection options that are described next operate within the K-map itself. Conditional upon the user single-clicking on a K-map entry or otherwise selecting a K-map entry in a step 260, the knowledge portal 10 displays preview or summary information for the selected K-map entry in the preview display pane 76. This advantageously enables the user to preview entries on the K-map before actually loading them into the document pane 72.

Conditional upon the user double-clicking or otherwise selecting (in a more strong manner than is used in the step 260) a map entry in a step 270, the knowledge portal 10 preferably displays the selected entry in the document display pane 72 and preferably updates the current object 82 in a step 272. Preferably, the knowledge portal 10 also constructs a K-map for the selected K-map entry and updates the K-map object parameter 84 appropriately in a step 274, and displays the new K-map in the K-map display pane 74 in a step 276.

The user options corresponding to the steps 260 and 270 together enable the user to navigate the K-map by first previewing an entry and then loading the entry into the document pane 72 only if it appears to be useful based on the preview information. It will be appreciated that the specific pointing device 68 operations, e.g. single-clicking to activate the step 260 and double-clicking to activate the step 270, are not unique. A number of variations are contemplated, such as hovering the pointing device over a K-map entry to activate the preview step 260 and single-clicking on the K-map entry to activate the loading step 270.

The invention has been described with reference to the preferred embodiments. Obviously, modifications and alterations will occur to others upon reading and understanding the preceding detailed description. It is intended that the invention be construed as including all such modifications and alterations insofar as they come within the scope of the appended claims or the equivalents thereof.

Having thus described the preferred embodiments, the invention is now claimed to be:

1. A user interface method for executing one or more operations in a computer for interfacing an associated user with a knowledge portal that is operatively associated with a plurality of data objects, the user interface method comprising:

displaying in a document pane at least a portion of first contents of a current object;

displaying in a map pane a K-map indicating objects which are cataloged in the knowledge portal as including second contents related to a selected K-map object, wherein a range of the objects included in the K-map displayed in the map pane is determined in accordance with a K-map parameter, the K-map parameter including at least one of a scope, a view selector, a class selector, and a K-map object parameter;

displaying in a preview pane third contents associated with a preview object selected from the K-map, wherein the document pane, map pane, and preview pane are displayed simultaneously on a single display device;

receiving a user input;

updating, based upon the received user input, at least one of a first identity of said current object, a second identity of said preview object, and the K-map parameter; and updating the K-map conditional upon the updating of the K-map parameter.

2. The user interface method as set forth in claim 1, wherein:

the updating, based upon the received user input, at least one of a current object identity, a preview object identity, and a K-map parameter includes updating the K-map view selector based upon the received user input to correspond to a node view; and the displaying in a map pane the K-map includes displaying a nonhierarchical node view of the K-map.

3. The user interface method as set forth in claim 1, wherein:

the updating, based upon the received user input, at least one of a current object identity, a preview object identity, and a K-map parameter includes updating the K-map class selector value based upon the received user input; and the updating a K-map conditional upon updating a K-map parameter includes updating the K-map to include objects corresponding to the K-map class selector value.

4. The user interface method as set forth in claim 3, wherein:

the updating a K-map class selector value includes updating the K-map selector value to correspond to one of a people class, a places class, and a things class based upon the received user input.

5. The user interface method as set forth in claim 1 wherein:

the updating, based upon the received user input, at least one of a current object identity, a preview object identity, and a K-map parameter includes updating the K-map scope based upon the received user input; and the updating a K-map conditional upon updating a K-map parameter includes updating the K-map to include objects which are cataloged in the knowledge portal as including fourth contents relating to the K-map object and having a strength of relationship respective to the K-map object within the updated K-map scope.

6. The user interlace method as set forth in claim 1, wherein:

the receiving a user input includes receiving a selection of an updated current object identity from the user through the K-map pane, the updated current object identity being one of the objects indicated in the map pane;

the updating, based on the received user input, at least one of the current object identity, the preview object identity, and a K-map parameter includes updating the K-map object to correspond with the updated current object; and the updating a K-map conditional upon updating a K-map parameter includes updating the K-map to include objects which are cataloged in the knowledge portal as including fourth contents related to the updated current object.

7. The user interface method as set forth in claim 1, wherein the receiving a user input includes receiving a selection of an updated preview object identity from the user through the K-map pane, the selected object identity being one of the objects indicated in the map pane, the method further comprising:

displaying in the preview pane third contents associated with the updated preview object without changing the displaying in the document panel.

8. The user interface method as set forth in claim 1, wherein:

the receiving a user input includes receiving a text entry through user highlighting of text in the document display pane;

the updating, based upon the received user input, at least one of a current object identity, a preview object identity, and a K-map parameter includes updating the K-map object to correspond with the received text entry; and the updating a K-map conditional upon updating a K-map parameter includes updating the K-map to include objects which are cataloged in the knowledge portal as including fifth content related to the selected text.

9. The user interface method as set forth in claim 7, wherein the preview pane third contents associated with the updated preview object and displayed in the preview pane are metadata stored in the knowledge portal rather than in the preview object itself.

10. An apparatus for executing one or more operations in a computer for interfacing an associated user with a knowledge portal operatively associated with a plurality of data objects, the apparatus comprising:

a computer having a processor and a data store coupled thereto, wherein the data store stores the plurality of data objects; and one or more computer programs, performed by the computer for: receiving a user input, updating, based upon the received user input, at least one of a current object identity, a preview object identity, and a K-map parameter, the K-map parameter including at least one of a scope, a view selector, a class selector, and a K-map object parameter, updating a K-map conditional upon updating the K-map parameter, displaying in a document pane at least a portion of first contents of the current object, displaying in a map pane the K-map, and displaying in a preview pane second contents associated with the preview object.

11. The apparatus as set forth in claim 10, wherein:

the updating, based upon the received user input, at least one of a current object identity, a preview object identity, and a K-map parameter includes updating the K-map view selector based upon the received user input, the K-map view selector having at least a node view selection option and a tree view selection option; and the displaying in a map pane the K-map includes selectively displaying one of a tree view and a node view of the K-map based upon the setting of the K-map view selector.

12. The apparatus as set forth in claim 10, wherein:

the updating, based upon the received user input, at least one of a current object identity, a preview object identity, and a K-map parameter includes updating the K-map class selector value based upon the received user input, the class selector including at least a people class selection option, a places class selection option, and a things class selection option; and the updating a K-map conditional upon updating a K-map parameter includes updating the K-map to include objects corresponding to the K-map class selector value.

13. The apparatus as set forth in claim 10, wherein:

the updating, based upon the received user input, at least one of a current object identity, a preview object identity, and a K-map parameter includes updating the K-map scope based upon the received user input; and the updating a K-map conditional upon updating a K-map parameter includes updating the K-map to include objects within the K-map scope.

14. The apparatus as set forth in claim 10, wherein:

the receiving a user input includes receiving a selection of the current object identity from the user through the K-map pane; and the updating a K-map conditional upon updating a K-map parameter includes updating the K-map to include objects related to the current object.

15. The apparatus as set forth in claim 10, wherein: the receiving a user input includes receiving a selection of the preview object identity from the user through the K-map pane.

16. The apparatus as set forth in claim 10, wherein:

the receiving a user input includes receiving a text entry supplied through user highlighting of text in the document display pane;

the updating, based upon the received user input, at least one of a current object identity, a preview object identity, and a K-map parameter includes updating an object K-map parameter to correspond with the received text entry; and the updating a K-map conditional upon updating a K-map parameter includes updating the K-map to include objects related to the selected text.

17. The apparatus as set forth in claim 10, further including:

simultaneously displaying the document pane, the map pane, and the preview pane on a single display device.

18. The apparatus as set forth in claim 10, wherein a range of the objects included in the K-map displayed in the map pane is determined in accordance with the K-map parameter.

19. An article of manufacture comprising a program storage medium readable by a computer and embodying one or more instructions executable by the computer to perform a method for executing an operation to perform a user interface method for interfacing an associated user with a knowledge portal operatively associated with a plurality of data objects, the method comprising:

generating a knowledge portal catalog cataloging data objects based on content, the knowledge portal contextually linking the objects based on document content;

displaying in a document pane at least a portion of first contents of a current object;

constructing a K-map identifying related objects having second contents related to a K-map object as measured by a strength of relationship between the related object and the K-map object;

displaying in a map pane the K-map, wherein a range of the objects included in the K-map displayed in the map pane is determined in accordance with a K-map parameter, wherein the K-map parameter includes at least one of a scope, a view selector, a class selector, and a K-map object parameter; and displaying in a preview pane third contents associated with a preview object selected from the related objects, the preview pane being displayed simultaneously with the document pane and the map pane.

20. The article of manufacture as set forth in claim 19, wherein:

the displaying in a map pane the K-map includes displaying a node view of the K-map limited to related objects having a strength of relationship respective to the K-map object greater than a specified value.

21. The article of manufacture as set forth in claim 19, wherein:

the displayed K-map includes objects corresponding to a user-selectable Kmap class selector value.

22. The article of manufacture as set forth in claim 21, wherein:

the K-map selector value corresponds to one of a people class, a places class, and a things class.

23. The article of manufacture as set forth in claim 19, wherein the method further includes:

receiving a selection of an updated current object identity from the user through the K-map pane;

constructing an updated K-map that includes objects related to the updated current object;

displaying at least a portion of fourth contents of the updated current object in the document pane; and displaying the updated K-map in the map pane.

24. The article of manufacture as set forth in claim 19, wherein the method further includes:

receiving a selection of the preview object identity from the user through the K-map pane.

25. The article of manufacture as set forth in claim 19, wherein the method further includes:

receiving a text entry supplied through user highlighting of text in the document display pane; and updating the K-map to include objects related to the selected text.

26. The article of manufacture as set forth in claim 19, wherein the method further includes:

updating the K-map object to correspond to one of a group consisting of: (i) a double-clicked K-map entry, (ii) text in the document pane that is highlighted by a user, and (iii) one or more search terms entered by a user; and updating the displayed K-map to identify at least (i) related objects having fourth contents related to the updated K-map object, and (ii) a measure of a strength of relationship between each related object and the updated K-map object.

27. A user interface for interfacing an associated user with a knowledge portal that is operatively associated with a plurality of data objects and contextually links the objects based on document content, the user interface comprising:

a means for receiving a user input;

a K-map processor for calculating a K-map corresponding to a current object and a set of K-map parameters, the K-map identifying objects indicated by a catalog of the knowledge portal as having first contents related to the current object, the set of K-map parameters including at least one of a scope. a view selector, a class selector, and a K-map object parameter;

a current object display pane for displaying at least a portion of second contents of the current object;

a K-map display pane for displaying the K-map; and a preview pane different from the current object display pane for displaying third contents corresponding to a preview object.

28. The user interface as set forth in claim 27, wherein:

the K-map display pane displays the K-map in a non-hierarchical node view.

29. The user interface as set forth in claim 27, wherein a range of the objects included in the K-map displayed in the map pane is determined in accordance with the set of K-map parameters.

30. The user interface as set forth in claim 27, wherein:

the K-map processor calculates a K-map containing objects limited to objects corresponding to the K-map class parameter.

31. The user interface as set forth in claim 30, wherein:

the means for receiving a user input include a pointing device selection means operative at least within the K-map display pane; and the class parameter is selectively updateable by the user via the pointing device selection means operating on a graphical class input dialog.

32. The user interface as set forth in claim 30, wherein: the class parameter selectively takes values including a people class value, a places class value, and a things class value.

33. The user interface as set forth in claim 27, wherein:

the K-map processor calculates a K-map containing objects limited to objects whose relationship to the current object falls within the K-map scope parameter value.

34. The user interface as set forth in claim 33, wherein:

the means for receiving a user input include a pointing device selection means operative at least within the K-map display pane; and the scope parameter is selectively updateable by the user via the pointing device selection means operating on a graphical scope input dialog.

35. The user interface as set forth in claim 34, wherein the graphical scope input dialog is a slider bar.

36. The user interface as set forth in claim 27, wherein:

the means for receiving a user input include a pointing device selection means operative at least within the K-map display pane; and the current object is selectively updateable by the user via the pointing device selection means operating within the K-map display pane.

37. The user interface as set forth in claim 27, wherein:

the means for receiving a user input include a pointing device selection means operative at least within the K-map display pane; and the preview object is selectively updateable by the user via the pointing device selection means operating within the K-map display pane, the updating of the preview object not affecting the current display pane.

38. The user interface as set forth in claim 27, wherein:

the set of K-map parameters includes an object parameter, said object parameter being selectively updateable by the user; and the K-map processor calculates a K-map containing objects related to the object corresponding to the object parameter.

39. The user interface as set forth in claim 38, wherein:

the means for receiving a user input include a pointing device selection means operative at least within the document display pane whereby the user selectively updates the object parameter by selecting text corresponding thereto from the second contents of the object display pane.

* * * * *